United States Patent
Williams, Sr.

(10) Patent No.: US 6,581,575 B2
(45) Date of Patent: Jun. 24, 2003

(54) FUEL DELIVERY VALVING AND HOSE SYSTEM

(76) Inventor: Lawrence Frederick Williams, Sr., 14115 Broadfording Church Rd., Hagerstown, MD (US) 21740

( * ) Notice: Subject to any disclaimer, the term of this patent is extended or adjusted under 35 U.S.C. 154(b) by 0 days.

(21) Appl. No.: 09/993,651

(22) Filed: Nov. 27, 2001

(65) Prior Publication Data

US 2003/0098017 A1 May 29, 2003

(51) Int. Cl.[7] .............................................. F02M 37/04
(52) U.S. Cl. ..................................... 123/510; 123/527
(58) Field of Search ................................ 123/527, 575, 123/576, 577, 578, 525, 1 A, 510, 198 D, 198 BD

(56) References Cited

U.S. PATENT DOCUMENTS

| | | | |
|---|---|---|---|
| 4,421,087 A | * 12/1983 | Schuurman | 123/445 |
| 4,483,302 A | * 11/1984 | Mannessen | 123/527 |
| 4,606,322 A | * 8/1986 | Reid et al. | 123/575 |
| 5,025,758 A | * 6/1991 | Djurdjevic | 123/527 |
| 5,337,722 A | * 8/1994 | Kurihara et al. | 123/527 |
| 5,542,398 A | * 8/1996 | Marcon | 123/527 |

* cited by examiner

*Primary Examiner*—Carl S. Miller

(57) ABSTRACT

The invention is directed to a fuel delivery valving and hosing system comprising a fuel source coupled to a regulator, a regulator coupled to a hose; a hose coupled to an automatic shut off valve, a hose coupled to a manual shut off valve, a hose coupled to T-junction, a hose from the T-junction coupled to a low RPM valve, a hose from the low RPM valve coupled to a second T-junction, the second T-junction coupled to a preset high RPM run valve and a hose from second T-junction coupled back to a high RPM run valve and to complete a loop. A hose from the preset high RPM flow-limiting valve goes to an injector, and the injector is coupled to an engine/power plant at the carburetor, carburetor insulator or manifold. The present invention will be highly efficient at regulating and controlling gaseous fuels supplied to the engine and produce cleaner emissions.

13 Claims, 1 Drawing Sheet

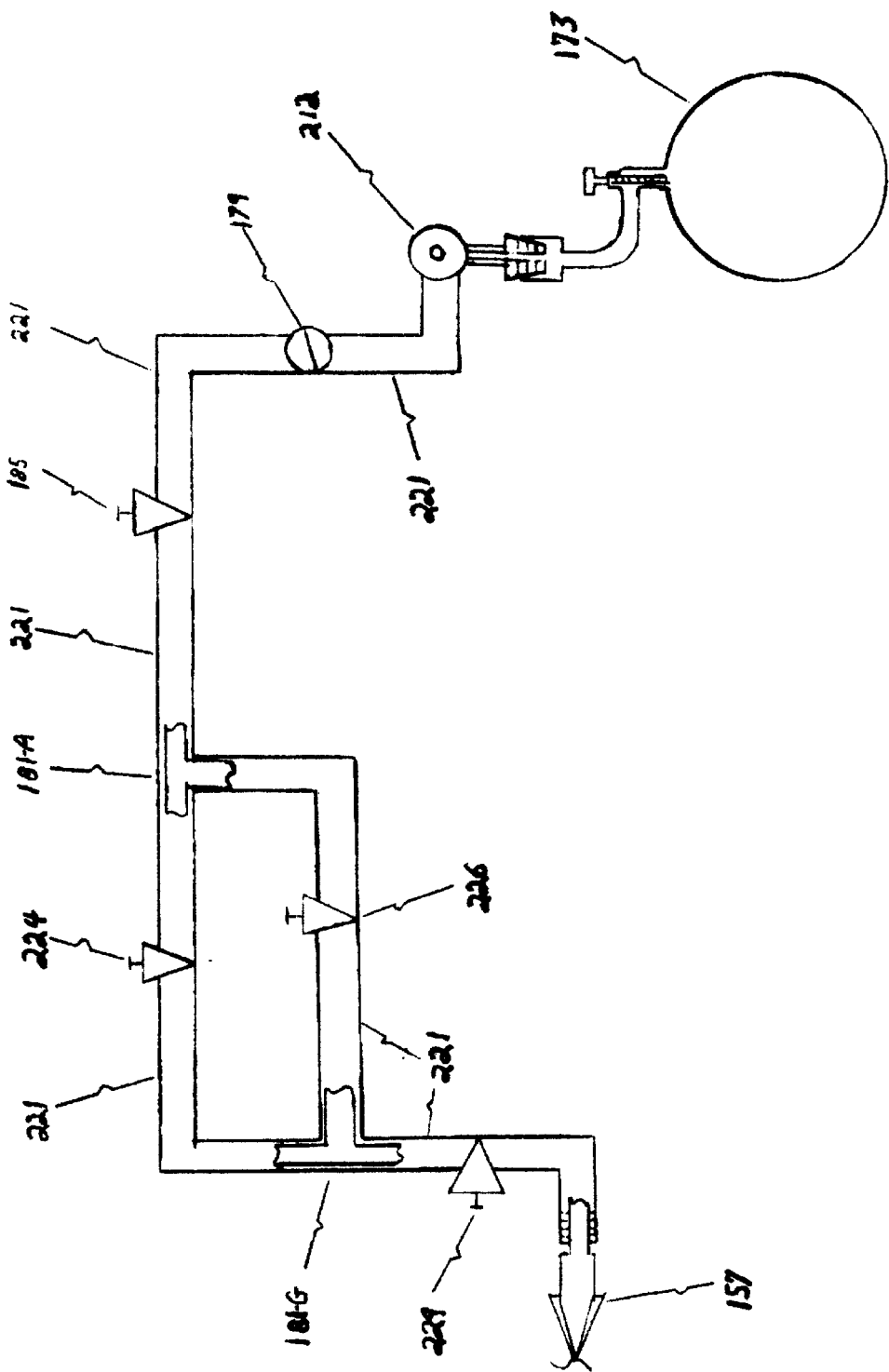

FUEL DELIVERY VALVING AND HOSE SYSTEM

BACKGROUND OF THE INVENTION

1. Field of the Invention

The invention relates to fuel delivery valving and hose systems.

2. Description of the Background

None of the prior art describes the use of a fuel delivery valving and hose system with the unique features provided by the present invention. While prior art references disclose engines and machines powered by gaseous hydrocarbon fuels, none discloses a fuel delivery valving and hose system that can be used with such a broad variety of fuels.

U.S. Pat. No. 5,377,646 issued to Ronald E. Chasteen on Jan. 3, 1995, discloses a gaseous fuel management system for an internal combustion engine, but does not teach or suggest it's use with a fuel delivery valving and hose system.

PCT International Publication Number WO 81/00282, published on Feb. 5, 1981 discloses a fuel supply system for internal combustion engines using liquefied petroleum gas. It does not teach or suggest the use of a delivery valving and hose system that can deliver CNG, LNG, LPG, Biogas and other kinds of gaseous fuels.

British Patent Number 1,158,934 published in July of 1969 discloses a dual fuel injection system and a method of controlling such a system. The first fuel may be gasoline and the second fuel may be liquefied gas.

None of these devices discloses the means to move fuel from a fuel supply source through a low/high valving system to an engine/power plant.

SUMMARY OF THE INVENTION

The present invention is an assembly of valve, hoses and couplings, coupled together to a fuel source at the inflow and coupled to an injector/carburetor/carburetor insulator at the engine/power plant.

An object of the invention is to allow a two or four-stroke engine/power plant(s) to run at a low and high RPM with less fuel consumption, using a single or multi gaseous or hydrocarbon fuels.

It is an object of the invention to provide improved elements and arrangements thereof in an apparatus for the purpose described which is dependable and fully effective in accomplishing its intended purposes.

It is an objective of the invention to provide an improved apparatus that is safe, dependable, inexpensive and fully effective in accomplishing its intended purpose/purposes as described.

It is also expected that the invention will require a minimal amount of fuel for starting and idling and a minimal amount of fuel consumption for running at higher RPM.

It is also expected that the present invention will be highly efficient at regulating and controlling gaseous fuels supplied to the engine, for cleaner emissions. These and other objects of the invention will become readily apparent upon further review of the following specification and drawings.

DESCRIPTION OF THE DRAWING

FIG. 1 is a perspective view of the first embodiment of the invention.

DESCRIPTION OF THE INVENTION

It may be seen that none of the above mentioned references teaches the use of a fuel delivery valving and hose system that can deliver gaseous or liquefied fuels to a two or four-stroke engine(s), reciprocating engine(s) or other internal combustion engine(s) and can be used with a broad spectrum of engines and thermo-technologies. For example, generators, motorized concrete buggies/georgia buggies, floor buffers, asphalt or concrete scarifiers/planes, concrete grinders, trash pumps, air compressors, paint sprayers, trowel machines, scissor lifts, boom lifts, light towers, compacting tampers/rollers, bobcats, steer loaders, backhoes, ditch witches, log splitters, cars, trucks, aircraft and motorcycles can be operated using the invention.

The disclosed Fuel Delivery Valving and Hose System is connected to the fuel source with a hose slid over a male barb and clamped in place. The fuel source can be a fuel tank, a fuel tank with a regulator or simply to a fuel line. The hose from the fuel source is connected to a main shut-off valve on its inflow side. An additional piece of hose is connected to the main shut off valve on its outflow side to an inflow T-junction, the tee allowing the fuel to go in two directions simultaneously or separately. The hose connected to a secondary part of the tee goes to a low RPM valve via a first arm. This valve outflow controls a low volume of fuel for starting and idling. There is another piece of hose connected to the tee outflow side which goes to a high RPM run valve inflow via a second arm. This high RPM run valve is kept shut until the engine is started, then opened to allow a controlled higher volume of fuel to pass through. A piece of hose is connected to the outflow of the high RPM run valve to a second T-junction. The low RPM run valve is connected to this same second tee by another hose. This arrangement creates a loop. When the high RPM run valve is off the fuel goes through the low RPM run valve for starting and idling. The second T-junction is connected to a high RPM flow-limiting valve by a hose. This valve is preset to insure that no more than the maximum controlled amount of fuel is delivered to the injector. The high RPM flow-limiting valve outflow is connected to a hose that is connected to an injector. This injector is tapped directly into a carburetor insulator or intake manifold.

The fuel delivery valving and hose system can be operated by computer or manually. The fuel delivery valving and hose system can use two or more fuels at the same time.

Through a series of valves that are preset to control the fuel flow, low and high volumes for starting, idling and high maximum RPM engine running are produced. The fuel delivery system is coupled to fuels of choice. Fuels used include the following: Liquefied petroleum gas (LPG), compressed natural gas (CNG), liquefied natural gas (LNG), and biogas. The system can also be used with a combination of gaseous and liquefied hydrocarbon fuels.

The fuel or fuels being delivered to the power plant through the fuel delivery valving and hose system can be shut off manually for safety, or can be shut off automatically by the use of a solenoid or vacuum switch. The fuel is shut off when the power plantlengine shuts down due to low oil or mechanical failure.

DETAILED DESCRIPTION OF THE PREFERRED EMBODIMENT

FIG. 1 shows the present invention in its first embodiment. A low/high pressure valving system is coupled to a two or four-stroke engine. A fuel source (173) is coupled to a regulator (212). The regulator is coupled to a fuel hose (221) and fuel hose (221) is coupled to a manual or automatic shut off valve (179). The shut off valve (179) is coupled to fuel hose (221), fuel hose (221) is coupled to a main on/off valve (185), main valve (185) is coupled to fuel hose (221), fuel hose (221) is coupled to Tee 181-A and Tee 181-A is coupled to fuel hoses (221). The fuel hoses take two different directions. The fuel hose (221) at the lower part of the resulting loop is connected to the low RPM-start idle valve (226), valve (226) is coupled to fuel hose (221), fuel hose (221) is coupled to high RPM run valve (224), high RPM run valve (224) is coupled to fuel hose (221) and fuel hose (221) is coupled to Tee 181-G, thus completing the loop. Tee 181-G is coupled to fuel hose (221), fuel hose (221) is coupled to a preset high RPM flow-limiting valve (229), the high RPM flow-limiting valve is coupled to fuel hose (221) and the fuel hose is coupled to a fuel injector (157) which is connected to a carburetor insulator. The carburetor insulator is between the carburetor and the intake manifold which, in turn, is connected to the engine/powerplant. The carburetor insulator, intake manifold and engine/powerplant are not shown.

It is to be understood that the present invention is not limited to the preferred embodiments described but encompasses any and all embodiments within the scope of the following claims.

What is claimed is:

1. A fuel delivery valving and hose system for regulating fuel flow between a fuel source and a power plant comprising:
    a hose connecting said fuel source to said power plant along which is placed:
    fuel flow regulator;
    a fuel shut-off valve; and
    a first T-junction along the hose wherein a first arm downstream of said T-junction contains a low RPM valve and a second arm contains a high RPM run valve, after which said first arm and said second arm join at a second T-junction to form a loop in said hose, and wherein a high RPM flow limiting valve is located downstream of said second T-junction.

2. The system of claim 1 wherein the fuel source is selected from the group consisting of liquefied petroleum gas, compressed natural gas, liquefied natural gas, biogas, a multi-fuel and combinations thereof.

3. The system of claim 2 wherein the multi-fuel comprises a propane fuel.

4. The system of claim 1 wherein the fuel shut-off valve is a manual or an automatic fuel shut-off valve.

5. The system of claim 1 wherein the low RPM valve is preset to provide for the flow of a controlled amount of fuel sufficient to start or idle said power plant.

6. The system of claim 1 the high RPM run valve can be adjusted for variable fuel flow during engine operation and to provide for the flow of another controlled amount of fuel sufficient to run the power plant.

7. The system of claim 1 wherein the power plant is an engine.

8. The system of claim 7 wherein the engine is a two-stroke engine or a four-stroke engine.

9. The system of claim 1 wherein the hose comprises a hard pipe or a soft pipe.

10. The system of claim 1 further comprising an injector for injecting fuel to said power plant.

11. The system of claim 1 further comprising a carburetor for regulating fuel to said power plant.

12. A method for regulating fuel flow to a power plant comprising:
    providing a source of fuel; and
    providing the fuel delivery valving and hose system of claim 1.

13. The method of claim 12 wherein the source of fuel is selected from the group consisting of liquefied petroleum gas, compressed natural gas, liquefied natural gas, biogas, a multi-fuel and combinations thereof.

* * * * *